United States Patent [19]

Andersen

[11] 4,132,536

[45] Jan. 2, 1979

[54] GAS FILTRATION PROCESS

[75] Inventor: John W. Andersen, Racine, Wis.

[73] Assignee: Rexnord Inc., Racine, Wis.

[21] Appl. No.: 721,063

[22] Filed: Sep. 7, 1976

[51] Int. Cl.$^2$ ............................................. B01D 51/10

[52] U.S. Cl. ........................................ 55/97; 432/67; 432/72; 241/16

[58] Field of Search ................ 55/84, 90, 97, 98, 259; 432/67, 72; 241/16; 252/381–384

[56] References Cited

U.S. PATENT DOCUMENTS

| | | | |
|---|---|---|---|
| 1,816,525 | 7/1931 | Gutensohn | 55/84 |
| 2,225,146 | 12/1940 | Bechtold | 241/16 |
| 2,364,555 | 12/1944 | Scripture, Jr. | 241/16 |
| 3,044,235 | 7/1962 | Schneider | 55/84 |
| 3,068,110 | 12/1962 | Fagerholt | 241/16 |
| 3,512,340 | 5/1970 | Golücke et al. | 432/72 |

FOREIGN PATENT DOCUMENTS

| | | | |
|---|---|---|---|
| 548,907 | 10/1942 | United Kingdom | 55/84 |
| 892474 | 3/1962 | United Kingdom | 241/16 |
| 388763 | 11/1973 | U.S.S.R. | 55/84 |

*Primary Examiner*—Frank W. Lutter
*Assistant Examiner*—David L. Lacey
*Attorney, Agent, or Firm*—Edward M. Steutermann

[57] ABSTRACT

The present invention provides a method for preventing cross crystallization of particulate matter entrained in, and to be removed from, a dirty gas stream on a selected filter media where the method includes the addition of 0.01% to 1% by weight of an organic volatile liquid to the gas stream and the weight percent of organic volatile liquid is based on the weight of particulate matter carried by the gas stream.

6 Claims, No Drawings

GAS FILTRATION PROCESS

BACKGROUND OF THE INVENTION

In calcining various solid materials, for example, dolomite lime, the off gas from the calcining operation carried significant amounts of fine particulate materials which must be removed from the gas stream before emission of the gas stream to the atmosphere to comply with environmental regulations.

To accomplish this objective, various filter devices have been provided to electrostatically or mechanically remove the particulate matter. One problem encountered in the removal of particulate material susceptible to cross crystallization by mechanical means for example, by passing the gas stream through selected media, is the propensity of certain inorganic materials such as lime or dolomitic lime to co-react in the presence of certain promotors to cause separate particles to adhere to each other, so that the particulate material agglomerates or combines in the presence of such cross crystallizing agents, such as water and carbon dioxide, with the formation of extremely large particles which are retained in the media thereby adversely effecting the efficiency of the filter media.

Additionally, the presence of cross crystallizing agents promotes growth of deposits of particulate material on the media surface leading to blinding of the supporting screens by the hard deposits with resulting permanent loss of efficiency in cleaning.

Presently, no satisfactory means are known for prevention of cross crystallization and the attendant problems in connection with the removal of certain particulate material from a gaseous stream.

SUMMARY OF THE INVENTION

In applications where particulate matter, for example dusts from limestone and dolomite calcination are removed from a gas stream passed through the calcining operation, the present invention provides a method for elimination and prevention of the formation of large particles or hardspots on filter media used for removal of the particulate matter. The present invention is particularly useful where the dusts or particulate matter are susceptible to cross crystallization and the formation of large particles and the formation of hard deposits on the media utilized for removal of particulate matter.

In summary, the present invention provides a method for prevention of the growth of large particles on filter media during a filtration process where particulate matter is removed from a gaseous stream and growth of hard deposits on the filter media is essentially prevented by the addition of 0.01% to 1.0% of a volatile organic liquid into the gas stream at a point downstream of the filtration apparatus where the organic material is added based on the weight of particulate matter carried into the filter arrangement by the gas stream.

Various other features of the present invention will become obvious to those skilled in the art upon reading the disclosure set forth hereinafter.

In the removal of dust from gaseous effluents, for example the gas stream from certain kiln operations such as calcination of limestone or dolomite, there is a tendency for the dust particles carried in the off gas from the calcination process to bond together in the collecting devices provided for dust removal because the dust particles are usually of a character susceptible to cross crystallization with consequent formation of large agglomerates or particles.

In such applications various collection devices, such as bag houses, gravel bed filters or filter systems providing other types of media are generally used to collect the particulate matter and the particles or agglomerates tend to block the media decreasing the efficiency of the media. The problem of agglomeration or cross crystallization is particularly acute where the collecting devices are operated at a temperature lower than the operating temperature of the kiln because the rate of cross crystallization is increased at lower temperature. Additionally, gases introduced to, or fond in, the kiln, including carbon dioxide, sulphur dioxide, sulphur trioxide, and water, characteristically act as cross crystallization agents, with the dust to form large size agglomerates or extremely large particles.

Other materials such as sublimed salts which may be found in the dust and carried by the gas stream are also susceptible to cross crystallization.

Upon cooling in the collection device the various undersirable effects are noted, such as (1) balling of the dust in low density balls which roll around on the media or penetrate the upper surface of particulate matter collected on the media in gravel bed filters (when the media is horizontally disposed); and (2) media growth due to hard deposits formed from cross crystalization of the dust particles on the media. The latter phenomena usually occurs on cloth media and the particles ultimately form large size hard deposit to blind the media.

The foregoing characteristics reduce the filtration efficiency of the filter media and/or greatly increase pressure drop through the media.

The foregoing problems are acutely emphasized in operations where the gaseous effluent carries a high percentage of water. The problems are also emphasized where the process contains significant amounts of various magnesium compounds, particularly magnesium oxide.

Specifically, the problem associated with magnesium compounds has been observed previously as a phenomenon which occurs in connection with magnesium oxide produced in low temperature calcination of magnesium carbonate which is particularly prone to subsequent reaction with carbon dioxide and water to produce basic magnesium carbonate which forms a hard dense material on the filter media.

It is one objective of the present invention to prevent the reaction of dusts with various components of the gaseous effluent in the dust collector resulting in the formation of large particles, agglomerates, and blinding of the filter media.

In accordance with the present invention, it has been found that introduction of a volatile organic material into the gas stream at some stage of the process, either before or at the particulate removal apparatus greatly reduces the tendency toward cross crystallization in certain dusts and prevents build-up of hard deposits of such materials on filter media. In ordinary applications, for example where a dust collecting system is provided in connection with the calcination of certain materials such as limestone or dolomite, or even the production of portland cement, the raw material is passed through a calcining kiln for example a rotary kiln, and the product emitted from the outlet of the kiln is then subsequently, and generally immediately, passed to a crushing and grinding apparatus. The off gas from the crushing and grinding apparatus or from the kiln, carries finely divided particles and is then passed through a cleaning device, for example a media bag house or gravel bed filter, for removal of the particulate material prior to emission of the air stream to the atmosphere.

The off-gas is cooled prior to, or at, the cleaning device and as previously noted the reduced temperature promotes cross crystallization so that the principal cross crystallization of the dust particles occurs at the cleaning device forming hard spots on the filter media. In horizontal gravel bed filters, large particles, or agglomerates formed during the passage of the dust through the conduits leading to the gas cleaning device strike the bed of accumulated particulate material collected on the media bed and tend to force the accumulated particulate material through the filter media to contaminate the gas stream emitted from the filter.

In other instances, for example, in the dead burning of dolomite, it has also been found that the injection of a volatile oil, for example, diesel oil, at the rate of from 0.01% to 1% by weight based on the weight of particulate matter admitted to the gas cleaning device eliminates buildup of particulate matter on the media in the downstream dust collecting device and further eliminates the formation of agglomerates in the process.

It has been found that various volatile organic liquids can be effective when added at various locations in the process, either when an air stream is initially added to the rotary kiln in a calcining process or when the organic material is added immediately prior to introduction of the air stream carrying the entrained particulate matter to the gas cleaning device.

The point of introduction of the organic material is determined principally by the characteristics of the process in which it is applied.

Other organic liquid additives including ethylene glycols and propylene glycols of various molecular weights have been found suitable to eliminate cross crystallization.

In all instances, the formation of undesirable particulates and cross crystallized agglomerates was substantially reduced and in most cases virtually eliminated by the addition of 0.01% to 1% by weight of organic material based on the weight of dust or particulate matter entrained in the dirty gas stream supplied to the gas cleaning apparatus.

It will be recognized that the foregoing are but a few examples of methods within the scope of the present invention and that various other methods, within the scope of the present invention, will occur to those skilled in the art upon reading the disclosure set forth hereinbefore.

The invention claimed is:

1. In a process for calcining and grinding a friable substance where an off-gas stream carrying entrained particulate material including material subject to cross-crystallization is emitted from the grinding process, and the off-gas stream is introduced to a filter media separator means for physical separation of a portion of the particulate material, introducing from 0.01% to 1.0% of a volatile organic liquid into the gas stream prior to introduction of the gas stream into the filter media separator means where the weight of the volatile organic liquid added is based on the weight of particulate material entrained in the gas stream.

2. The invention of claim 1 wherein the volatile organic liquid is introduced after the calcining operation.

3. The invention of claim 1 wherein the volatile organic liquid is introduced after the grinding process.

4. The invention of claim 1 where the volatile organic liquid includes diesel oil.

5. The invention of claim 1 where the volatile organic liquid includes ethylene glycol of molecular weight susceptible to volitalization at the pressure and temperature conditions prevailing in the process.

6. The invention of claim 1 where the volatile organic liquid includes propylene glycols of molecular weight susceptible to volatilization at the pressure and temperature conditions prevailing in the process.

* * * * *